US007340422B2

(12) United States Patent
Fisher

(10) Patent No.: US 7,340,422 B2
(45) Date of Patent: Mar. 4, 2008

(54) SYSTEMS AND METHOD FOR MANAGING AND PROCESSING OF TELECOMMUNICATIONS INVOICES

(75) Inventor: Jason M. Fisher, Memphis, TN (US)

(73) Assignee: Asentinel LLC, Memphis, TN (US)

( * ) Notice: Subject to any disclaimer, the term of this patent is extended or adjusted under 35 U.S.C. 154(b) by 124 days.

(21) Appl. No.: 10/361,519

(22) Filed: Feb. 10, 2003

(65) Prior Publication Data

US 2004/0158510 A1 Aug. 12, 2004

(51) Int. Cl.
*G07B 17/00* (2006.01)
*G07F 19/00* (2006.01)

(52) U.S. Cl. ............................ 705/30; 705/32; 705/34; 705/40

(58) Field of Classification Search .................. 705/30, 705/29, 28, 32, 38, 39, 40
See application file for complete search history.

(56) References Cited

U.S. PATENT DOCUMENTS

| | | | | |
|---|---|---|---|---|
| 5,287,270 | A | 2/1994 | Hardy et al. | |
| 5,325,290 | A | 6/1994 | Cauffman et al. | |
| 6,032,132 | A | 2/2000 | Nelson | |
| 6,032,133 | A | 2/2000 | Hilt et al. | |
| 6,052,450 | A * | 4/2000 | Allison et al. | 379/127.06 |
| 6,058,380 | A | 5/2000 | Anderson et al. | |
| 6,070,150 | A | 5/2000 | Remington et al. | |
| 6,078,907 | A | 6/2000 | Lamm | |
| 6,119,106 | A | 9/2000 | Mersky et al. | |
| 6,223,168 | B1 | 4/2001 | McGurl et al. | |
| 6,289,322 | B1 | 9/2001 | Kitchen et al. | |
| 6,292,789 | B1 | 9/2001 | Schutzer | |
| 6,311,170 | B1 | 10/2001 | Embrey | |
| 6,360,211 | B1 * | 3/2002 | Anderson et al. | 705/40 |
| 6,363,362 | B1 | 3/2002 | Burfield et al. | |
| 6,366,893 | B2 | 4/2002 | Hannula et al. | |
| 6,532,281 | B1 * | 3/2003 | Schoenborn | 379/114.01 |
| 6,639,975 | B1 * | 10/2003 | O'Neal et al. | 379/112.01 |
| 6,885,997 | B1 | 4/2005 | Roberts | |
| 7,013,112 | B2 * | 3/2006 | Haller et al. | 455/41.2 |
| 7,065,496 | B2 | 6/2006 | Subbloie et al. | 705/11 |
| 7,136,467 | B2 | 11/2006 | Brockman et al. | |
| 2002/0123919 | A1 | 9/2002 | Brockman et al. | |

(Continued)

FOREIGN PATENT DOCUMENTS

WO WO 00/67176 A2 11/2000

OTHER PUBLICATIONS

MBG Products & Services Telco Bill Presentation "iBillManager". Veramark Technologies (Nasdaq: VERA).
Pooniah, Paulraj, "Data Extraction, Transformation, and Loading," Data Warehousing Fundamentals: A Comprehensive Guide for IT Professionals, XX, XX, 2001, pp. 257-289, XP002379817.

(Continued)

*Primary Examiner*—F. Zeender
*Assistant Examiner*—Christopher Buchanan
(74) *Attorney, Agent, or Firm*—Sterne, Kessler, Goldstein & Fox, P.L.L.C.

(57) ABSTRACT

A system and method for management and processing a plurality of types of telecommunication invoices at a user's site involving importing the plurality of types of telecommunication invoices to provide comparable telecommunication invoices and auditing the comparable telecommunication invoices by performing an automated reasonability test on the comparable telecommunication invoices. The system and method also provide a means for approving, processing and reporting on the comparable telecommunication invoices.

56 Claims, 2 Drawing Sheets

U.S. PATENT DOCUMENTS

| | | | | |
|---|---|---|---|---|
| 2003/0182206 | A1* | 9/2003 | Hendrix et al. | 705/26 |
| 2003/0233321 | A1* | 12/2003 | Scolini et al.. | 705/40 |
| 2004/0044602 | A1* | 3/2004 | Batur et al. | 705/34 |
| 2004/0064389 | A1* | 4/2004 | Force et al. | 705/34 |
| 2004/0153382 | A1* | 8/2004 | Boccuzzi et al. | 705/34 |
| 2004/0193512 | A1* | 9/2004 | Gobin et al. | 705/29 |

OTHER PUBLICATIONS

Seligman, Len et al., “XML’s Impact on Databases and Data Sharing,” Computer, IEEE Service Center, Los Alamitos, CA, Us, vol. 34, No. 6, Jun. 2001, pp. 59-67, XP001103951.

Supplemental European Search Report for PCT/US2004/003917, dated Aug. 22, 2007, 4 pages.

* cited by examiner

SYSTEMS AND METHOD FOR MANAGING AND PROCESSING OF TELECOMMUNICATIONS INVOICES

RELATED APPLICATIONS

NOT APPLICABLE

BACKGROUND OF THE INVENTION

1. Field of the Invention

The present invention relates to a system and method for electronically managing a plurality of types of telecommunications invoices.

2. Description of Prior Art

The traditional manual methods of collecting, reviewing and paying vendors' invoices, especially periodic invoices, e.g., telecommunications and utility bills, are a manual process. These methods impose substantial difficulties for users having large volumes of such invoices.

One format designed to bring uniformity to these invoices is the electronic data interchange (EDI) standard. EDI is the direct communication of trading messages between computer systems using national and international telecommunications networks. EDI transaction files can be as basic as orders and invoices, but EDI can also develop into a much more sophisticated information exchange so that trading partners may manage their whole supply chain more effectively. Key elements in EDI are the application software at either end of the exchange, linked to EDI message handling software that is in turn linked to a communications network.

While the EDI standard is very flexible to accommodate various types of transactions and businesses, this variety provides difficulties in the audit function, as vendor files differ in their implementation of the EDI standard.

Another format designed to bring ease of information exchange between businesses is the extensible markup language (XML) standard. XML 1.0 was released in February 1998. XML is now viewed as the standard way information will be exchanged in environments that do not share common platforms.

While the XML standard is very flexible to accommodate various types of transactions and businesses, this variety provides difficulties in the audit function, as vendor invoice files differ in their implementation of the XML standard.

Presently, there are a few similar inventions. One type of solution is MBG's (New York, N.Y.) solution for telecommunications providers, iBillManager®. It is a web-based billing system that enables telecom carriers to present invoices electronically over the Internet or corporate intranet. While the solution is also web based and presents telecom invoices and the detail, it is presented from the view of one provider and is not designed to present invoices from multiple telecommunications providers. The solution also does not provide any audit capability.

Another is type of solution is call accounting software. Veramark's (Pittsford, N.Y.) solution for Web-based call accounting software is eCAS®. Call accounting software extracts call detail records from the user's phone hardware to analyze telecommunications usage. This information does not directly tie back to the vendors billing due. This information can be used to analyze and audit inter-company expenses but it doesn't analyze vendor invoices for errors. It also doesn't support the entire telecommunications infrastructure because it is limited to only inbound and outbound voice traffic and only on traffic that runs through the user's hardware.

SUMMARY OF THE INVENTION

The current invention provides a system and a method that permits a user to electronically audit and process a plurality of types of telecommunication vendor invoices. "Telecommunication" is defined as service that provide the ability for individuals or systems to communication over a distance including but not limited to local and long distance phone services, wireless services, and data services. A type of invoice includes, but is not limited to, EDI as a type and XML as another type of invoice. A plurality means at least two different types of invoices can be received. The system includes a means for communicating a plurality of types of invoices from a vendor site to a user site and a means for performing an automated reasonability test on the invoices at the user site.

More specifically, this invention provides a system for processing a plurality of types of telecommunication invoices received by a user from a plurality of vendors. The system including:

(a) means for importing a plurality of types of telecommunication invoices to a user database from a plurality of vendors to provide comparable telecommunication invoices;

(b) means for auditing the comparable telecommunication invoices by the user;

(c) means for approving the comparable telecommunication invoices by the user; and (d) means for processing the comparable telecommunication invoices by the user.

Additionally, this invention provides a system for management of a plurality of types of telecommunication invoices received by a user from a plurality of vendors. This system including:

(a) means for importing a plurality of types of telecommunication invoices to a user database from a plurality of vendors to provide comparable telecommunication invoices;

(b) means for auditing the comparable telecommunication invoices by the user;

(c) means for reporting comparable telecommunication invoices by the user;

(d) means for approving the comparable telecommunication invoices by the user; and (e) means for processing the comparable telecommunication invoices by the user.

A method to process a plurality of types of telecommunication invoices received from a plurality of vendors comprising:

(a) importing a plurality of types of telecommunication invoices from a plurality of vendors through mapping modules corresponding to a plurality of types of telecommunication invoices to obtain comparable telecommunication invoices;

(b) auditing the comparable telecommunication invoices;

(c) approving the comparable telecommunication invoices; and (d) processing the comparable telecommunication invoices.

More specifically, using the present invention, a user can (1) receive invoice information by any of a variety of methods, including electronically, from a vendor; (2) automatically audit the invoice information, resulting in either approval of the invoice information or identification of billing exceptions; (3) notify the vendor of any billing exceptions; (4) pay the vendor by electronically transmitting a file to the user's accounts payable ("AP") system in fixed length, delimited or XML file formats; (5) allocate costs by electronically transmitting a file to the user's general ledger ("GL") system in fixed length, delimited or XML file formats; and (6) maintain historical information, which permits trend analysis and management reporting. The advantages of the present invention over conventional systems and techniques are numerous and include the following: (1) a paperless invoice processing thus an increased efficiency; (2) a drastic reduction in the administrative costs and human resources needed for processing invoices; (3) a real time updating of supplier accounting and thus no penalizations for the user; (4) an electronic data input to accounting systems, reducing invoice accuracies; (5) a large number of specialized reports, including audit, summary and customizable (custom) reports, that will provide the user with valuable feedback on the transactions that are processed through the system; (6) an improved way to communicate and have feedback to the vendor, regarding invoices received from him; (7) a trend of invoices received by a user from one vendor that provides the user with the possibility of comparison of received invoices.

DESCRIPTION OF THE INVENTION

I. Distributed Embodiment

Figure 1:
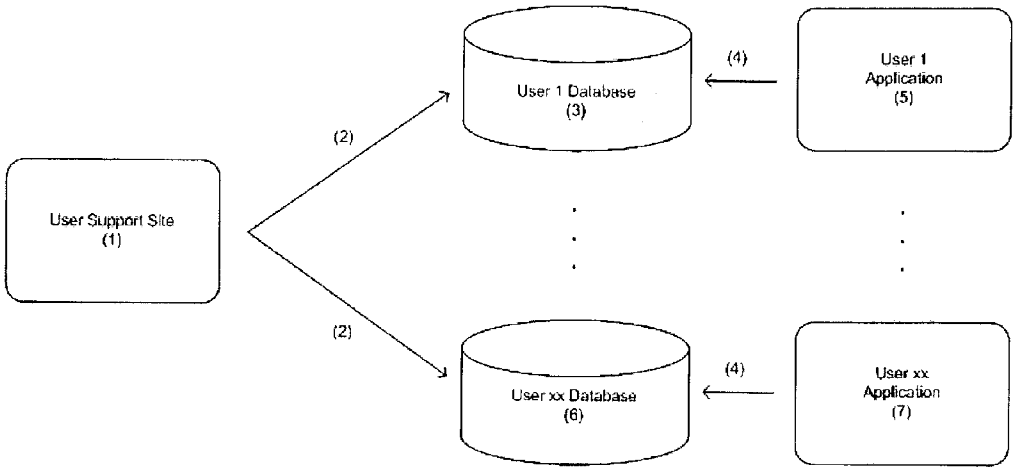
FIG. 1 represents the distributed embodiment of the present invention.

Now referring to FIG. 1, the present invention uses a distributed architecture in which a user database 3 is located at a user site. Portions of the user database 3 are maintained remotely through a user support site 1. The portions are routinely updated to keep the system up to date with the latest vendors and their corresponding service offerings. Vendor mapping rules are replicated to the user's database 3 from user support site 1 via communication pathway 2, such as the Internet. The user database 3 is maintained by a series of computer-implemented processes, i.e., computer programs, which run on the user database 3 to stay current with vendor invoice mapping rules received from the user support site 1. Reports may be generated to test synchronization that must exit between the user database 3 and the user support site 1.

The user database 3 includes the vendor mapping rules replicated from the user support site 1, the user's vendor invoices, and all of the tables for the user application 5. A table is a portion of database that is groups like records together, such as, but not limited to, user table, user rights table, dictionary table defining drop down boxes. The user application 5 is the functional portion of the invention where the user enters information manually, the system enters information electronically, the user views information, and the system outputs information electronically. All of this information is accessed from the user database 3 via the communication pathway 4.

Multiple users may be supported by the user support site 1. User database 3 can be and normally would be located at another location designated by the user. This user database 3 can be maintained remotely through a user support site 1 via communication pathway 2. Similarly, user application 5 is also located another location designated by the user. Similarly, any number of other user databases 6 and user applications 7 can be installed and maintained from one common user support site 1 via a communication path 2.

II. Data Flow and Major Processes

Figure 2:
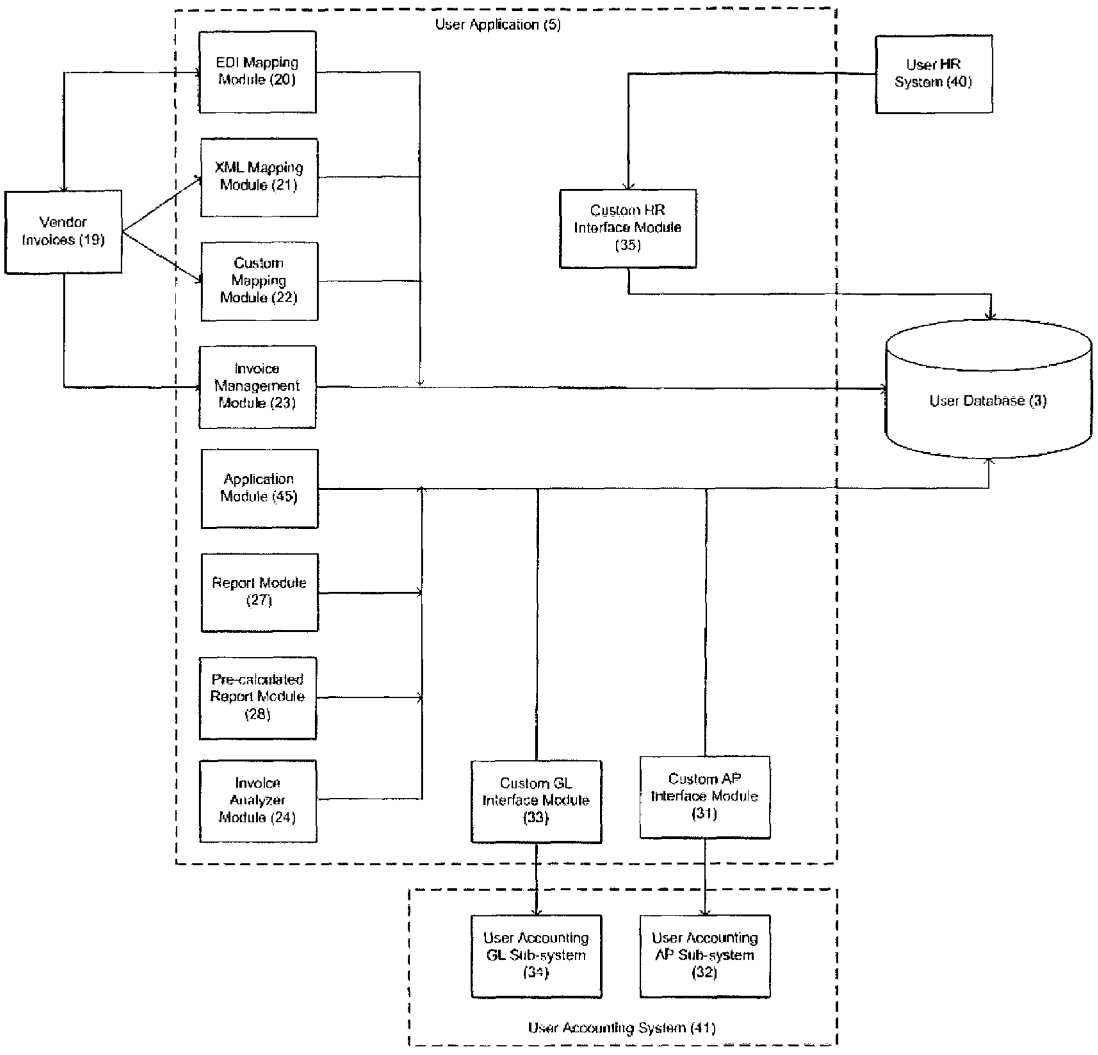
FIG. 2 is a data flow diagram which depicts the flow of data between major processes in the present system.

The distributed embodiment described in FIG. 1 is more fully shown in FIG. 2. The user application 5 is made of various modules that can receive inputs from vendors and provide output to the user database 3, user human resource system 40, and user accounting system 41. A module is a component of the system that can be removed and the system can still function without the functionality of the module. It has a predefined set of inputs and outputs. These inputs and outputs can be from or to system or user. The system includes means for: importing types of telecommunication invoice information to a user database 3 to provide comparable telecommunication invoices. Invoices are comparable when the basic elements of the invoice are placed in common categories. These common categories can include, but are not limited to, such items as taxes and surcharges. They system also includes means for auditing, approving and processing the comparable invoice information. The following sections describe various means to accomplish these functions.

A. Means for Importing a Plurality of Types of Telecommunication Invoice Information to User Database The system includes a means for importing a plurality of types of telecommunication invoice information into a user database 3. A plurality of invoice types means more than one type. Type of invoices include: EDI, XML, custom and paper invoices. The types of vendor invoices can be imported by importing this data through the mapping process. The mapping process takes vendor specific charges and places them in common categories based on service rendered. For example, under local service, call-waiting, call forwarding, voice mail, and caller ID are all features that can be removed and still have the service so they are categorized as feature charges and grouped together. A mapping module is a component of the system that for each service rendered on a type of types of invoice provides a common category for comparison. The corresponding mapping module is the mapping module that allows the categorization of specific telecommunication invoice entries; that is an XML invoice goes to an XML mapping module 21. A XML mapping module 21 is the corresponding mapping module for a XML invoice.

Multiple types of vendor invoice 19 information can be received, including EDI invoices using the EDI Mapping Module 20, e.g., both 810 invoices and 811 invoices; XML invoices using the XML Mapping Module 21, e.g., cXML; custom electronic invoices using the Custom Mapping Module 22 and traditional paper invoices using the Invoice Management Module 23. The term automated input modules means the EDI mapping, XML and custom mapping modules. The Custom Mapping Module 22 offers the possibility for the user of the application to import other formats of files that contain invoices, such as XLS or DBF files. This module provides the user an interface to browse their computer or network for vendor invoice files that they want to import into the application. As the telecommunications invoice information is imported by these various modules, it is organized into comparable categories and is referred to as comparable telecommunication invoice information.

EDI invoices are received via a traditional EDI delivery path, e.g., value added network (VAN). The file(s) are collected by the EDI Mapping Module 20 at designated times, e.g., on a daily, hourly, minute, or real-time basis. Upon receipt of the file(s), the EDI Mapping Module 20 performs a series of checks (see Table 1) on the invoice(s) contained in the individual EDI file(s). If an error is detected, action is taken in accordance with Table 1. After the invoice(s) are successfully entered into the User Database 3, the Invoice Analyzer 24 audits the invoice(s).

XML invoices are received via a traditional XML delivery path, e.g., HTTP or FTP. The file(s) are collected by the XML Mapping Module 21 at designated times, e.g., on a daily, hourly, minute, or real-time basis. Upon receipt of the file(s), the XML Mapping Module 21 performs a series of checks (see Table 1) on the invoice(s) contained in the individual XML file(s). If an error is detected, action is taken in accordance with Table 1. After the invoice(s) 19 are successfully entered into the User Database 3, the Invoice Analyzer 24 audits the vendor invoice(s) 19.

Custom invoices are received via any electronic delivery method, e.g., Internet, CDROM, or floppy disc. The file(s) are collected by the "Custom Import" facility and entered into the Custom Mapping module 22 on a real-time basis. Upon receipt of the file(s), the Custom Mapping Module 22 performs a series of checks on the invoice(s) contained in the individual file(s). After the invoice(s) are successfully entered into the User Database 3, the Invoice Analyzer 24 audits the vendor invoice(s) 19.

Paper invoices are received from a vendor via a traditional delivery path, e.g., first-class mail. Upon receipt, the user of the application manually enters the paper invoices into the application using the Invoice Management Module 23. The term manual input module refers to a means to manually import types of telecommunication invoice information to user database 3. After the vendor invoice(s) 19 are successfully entered into the User Database 3, the Invoice Analyzer 24 audits the vendor invoice(s) 19.

The Invoice Management Module 23 is also used to view and edit the invoice after it has been input into the User Database 3. The user can use this module to view the exceptions that have been found in the invoice and see descriptions for reason that the exception was generated. The user can see the details for all of the individual charges for each line item in the invoice. For example under local service, the user can see the various charges that comprise monthly service for a single phone line including the USOC code and the USOC description for each charge related to the monthly service charges.

Each of the paper invoices and electronic invoices is stored as distinct records in the invoice table of the user database. The term types of means any of the above discussed invoice types that can be received from a vendor and imported into the user database 3. Each record has an identifier that indicates the type of the invoice, e.g., paper or electronic.

B. Means for Auditing the Comparable Telecommunication Invoices

The term audit means to analyze individual charges at its smallest component, to verify its' correctness, i.e., lack of irregularities. In this system, automated reasonability testing can be conducted on comparable telecommunication invoices. The Invoice Analyzer 24 retrieves each new invoice or edited invoice from the User Database 3 and performs an automated reasonability test. For new invoices, the Invoice Analyzer 24 evaluates each line item of the invoice for billing irregularities or "exceptions", and assigns a flag along with a description based upon the analysis criteria that the application and user have established for the various types of service corresponding to the invoice. Types of invoice exceptions are found in Table 2. For edited invoices, the Invoice Analyzer 24 only evaluates the line item that was changed. In both cases, the Invoice Analyzer 24 is invoked by the component that is handling either the input or editing of the invoice, e.g. the various Mapping Modules 20, 21 and 22 or the Invoice Management Module 23.

All of the invoice line items and any exceptions that belong to the invoice are presented in the invoice grid of the Invoice Management Module 23.

C. Means for Approving the Comparable Telecommunication Invoices

After the vendor invoice 19 is input into the User Database 3 and reviewed by the Invoice Analyzer 24, a user must review and approve the comparable telecommunication invoice. The actual invoice detail can be displayed in the Invoice Management Module 23. The invoice detail is broken down into its various types of service. All invoices have at least one service type, but can have any number of different types of service as well. For example, one invoice might contain only long distance bills and another invoice may contain long distance bills and another invoice may contain long distance, local, and frame bills. The invoice detail for each of the various service types looks slightly different due to the different type of charges that are associated with them. If any exceptions appear (designated as red in the grid), the user can click the "Exception details" to see the reason the item was marked as an exception. If the user agrees that the charges are valid and "clears" the exception, then the item's background color will be turned from red to yellow. The user may proceed to continue reviewing the invoice until all items are "cleared" or mark the various service types of the invoice as "reviewed" by clicking on the Review/Approve button. The only exception that must be resolved prior to designating an invoice as "reviewed" is the cost center exception. Each line item must be assigned to a currently active cost center prior to being reviewed or approved for payment. This is to ensure that all of the costs associated with the invoice are allocated properly.

The user can also set bookmarks to certain rows in the grid (specific line items), which he may want to look at later.

The status of the invoices that appear in the tree situated in the left region of the Invoice screen, where the invoices are grouped in two major categories: Approved and Pending Approval (see Table 3).

D. Means for Processing the Comparable Telecommunication Invoices

Both AP and GL refer to the final step in the process of invoices and either may be processed in the same or separate processes. AP and GL refer to distinct phases that occur after the invoices are approved. The system provides flexibility to allow users to approve an invoice for both AP and GL processing, just AP processing, or just GL processing. This flexibility allows users to pay an invoice and allocate costs, only pay the vendor and not allocate costs, or only allocate the costs and not pay the vendor respectively.

The AP and GL refer to distinct operations that occur after the invoices are approved. The Custom Accounts Payable (AP) Interface Module 31 sends all approved invoices not yet sent to the User Accounting AP subsystem 32. The User Accounting AP system 32 then creates the payment(s) for the vendor(s) using the information supplied through the AP file. It is possible for the AP system to also process the GL items as well or this can be processed with a separate GL system.

The Custom General Ledger (GL) Interface Module 33 sends all approved invoices not yet sent to the User Accounting GL system 34. The User Accounting GL system 34 then creates the necessary debits and credits using the information supplied through the GL file.

The AP/GL process can be set to run at a predetermined time, hourly, daily, weekly, or monthly. This process consists of sending one or more files of a predetermined format such as XML, delimited, or flat file. The format for the AP and GL files and where the files are transmitted are stored in separate XML configuration files for the Custom AP Interface Module 31 and the Custom GL Interface Module 33.

The process of importing and auditing a plurality of types of telecommunication invoices is more specifically described in this section.

The present invention uses various methods to import vendor invoices 19. Vendor invoices 19 can come into the user application 5 via one of three methods. The first method is to receive the invoice on paper. Paper invoices are entered into the user application 5 through the Invoice Management Module 23. The user selects the vendor from the current list of active vendors and then the types of services in the invoice. The line items and charges are then entered manually into the user application 5. When the user saves the invoice, the invoice analyzer module 24 performs an audit on the invoice.

The second method for receiving invoices is via XML or EDI. These invoices are sent to the user application 5 via email, FTP, HTTP, a VAN or any other transfer protocol. These invoices are collected in one common location that the user application 5 monitors. Typically, this is a local system file folder on the server. The user application 5 will monitor this directory for files in a real-time or batch mode. In the real-time mode, the user application 5 will automatically start the import procedure when a new file is received. In the batch mode, the user application 5 will wait until a specified time to monitor the common location for any new files. The user application 5 then analyzes the file or files to determine if it is an EDI file or an XML file. The user application 5 then branches to one of two modules dependent on the type of file.

For EDI files, the user application 5 looks at the header of the file to determine the vendor. If the vendor is unknown the user application 5 will send a 997 response file as specified in the EDI standard. If the vendor is known the user application 5 will extract the vendor specific mapping rules from the user database 3 and begin the importing process. Once the file is imported the user application 5 verifies the invoice total. If the total does not equal the sum of the charges at the line items, then the invoice is purged from the database and an error message is generated. When the import is complete, the invoice analyzer module 24 performs an audit on the invoice. After this, the process returns to waiting for more files or importing the next file in the common location.

For XML files, the user application 5 looks at the header of the file to determine the vendor. If the vendor is unknown the user application 5 will generate an error message. If the vendor is known the user application 5 will extract the vendor specific mapping rules from the user database 3 and begin the import process. Once the file is imported the user application 5 verifies the invoice total. If the total does not equal the sum of the charges at the line items, then the invoice is purged from the user database 3 and an error message is generated. When the import is complete, the invoice analyzer module 24 performs an audit on the invoice. After this, the process returns to waiting for more files or importing the next file in the common location.

The third method for receiving invoices is via custom electronic invoices. These invoices are sent in the vendor's specific billing format. These can be CDROMs from their own bill management systems, spreadsheets, etc. The user receives these invoices and then goes to the custom mapping module 22 and selects the vendor and the location for the invoice such as a floppy disc, CDROM, or local folder. The user application 5 then imports the invoices using algorithms hard coded for that type of file format and that vendor. Once the file is imported the user application 5 verifies the invoice total. If the total does not equal the sum of the charges at the line items, then the invoice is purged from the database and an error message is generated. When the user saves the invoice, the invoice analyzer module 24 performs an audit on the invoice.

E. Means for Reporting Comparable Telecommunication Invoices

The invention provides a large number and different types of reports, such as audit, custom and summary reports using the Report Module 27. Several of the reports require the server to precalculate values so that the report can be viewed in a reasonable amount of time. This includes reports such as monthly, quarterly, and annual reports. The Pre-calculated Report Module 28 maintains these values as new information is added to the system. Various types of reports contemplated by this invention are shown in Table 4.

The audit reports allow the user to view exceptions across a range of vendors, types of service, and dates. The custom reports allow the user to view all of the bill details across a range of vendors, types of service, and dates.

The summary reports are comparable reports on invoices, vendors, cost centers, reoccurring invoices, accounts payable, general ledger, circuit mappings, system information (that will report information that is missing in the database and should be entered: for vendors, phone numbers, circuit ids etc) etc.

G. Inputs Related to Processing

The system provides for integration with other external systems such as the User's Human Resource (HR) System 40 and the User's Accounting System 41 by means of the Custom Accounts Payable (AP) Interface Module 31, the Custom General Ledger (GL) Interface Module 33, and the Custom HR Interface Module 35.

The Custom HR Interface Module 35 allows the system to import information relating to the user's cost centers. This information traditionally is found in the user's HR system but can be imported from any other system that provides this information. The most important piece of information regarding the cost center is whether it is active or inactive currently. In addition, cost center information such as the address, phone number, manager's name, number of full-time employees, etc. can be imported into the system.

Each of these interface modules are configured using XML configuration files. The external systems receive and send information in a variety of file formats such as XML, delimited, or flat file formats. The file format and the format of the information transferred is specified in the XML configuration files. Each Interface Module has its own XML configuration file. This configuration file begins by identifying the format of the file such as XML, delimited, or flat file. If the format for the transmitted file is XML then the configuration file contains the tags used to identify the data elements in the file. If the format for the transmitted file is delimited then the configuration file contains the delimiter and the order of the data elements in the file. If the format for the transmitted file is flat then the configuration file contains the order and length of the data elements in the file.

II. Application Module

The Application Module 45 is the part of the system that allows a user to interact with the system such as to approve and view audited information. More specifically, various tools are provided to accomplish the function of the system. These tools include:

A. Login

The Application Module 45 is designed to allow users different access to processes and reports depending on their access rights. Therefore all users must have a valid login username and password to enter the system. This username and password does not have to but it can be authenticated with another external system using a protocol such as Lightweight Directory Access Protocol (LDAP).

B. Common Toolbar

The toolbar provides access to the various sections of the User application 4. The toolbar is always available and provides navigation between the various sections.

C. What's New

The What's New screen provides every user with an interface to view the items in the system that relate to their access rights. It shows invoices that have been added and the date it was entered and a list of invoices pending approval in the system and a summary of invoice including the vendor name, types of service, invoice amount, number of exceptions, number of cleared exceptions, and the users that are assigned. The users "To Do" items are also displayed in the What's New page.

D. Deleted Items

The system offers a capability similar to the Recycle Bin (Windows) that means that specific key-items in the system are not purged from the system when a user performs the delete action. They appear as deleted but they can be viewed, restored or purged from the Deleted Items section. There is such a Deleted Items section that appears for Voice, Data and Equipment and also there is a Deleted Items section for the user that has administrator rights (Admin). The administrator is the only user authorized to purge or restore items from Recycle Bin. Other types of users may only view deleted items in the above-mentioned Deleted Items sections.

E. Drafts

The drafts section provides the means of storing draft information for key-items such as invoices, cost centers, vendors, phone numbers etc. This draft section provides a means for temporarily storing this information, before it is actually saved as valid information in the present system.

F. To Do

The to do is section offers the users the capability to track tasks that are going to be made by a specific user. These tasks can be assigned to the user by another user of the system, tasks that the user assigned to himself, or tasks created by the system automatically. These tasks can be filtered by "All", "Open" or "Closed".

G. Invoice Details

The application module 45 allows a user to view specific invoice details such as: invoice comments, vendor remittance, invoice splits, approve/review invoice, edit invoice, split as previous, accrue invoice, view invoice trend, bill details or invoice exceptions.

IV. Technical Specifications

A. General Hardware and Software Requirements:

This software is web-based. The web pages are displayed using either Internet Explorer 5.0 or higher, or Netscape Communicator 4.73 or higher. Due to the volume of information being displayed on the user screens, the screens are designed to be viewed on 1280×1024 displays.

One of the following server platforms can be used: Sun Solaris, MS Windows 2000 Server or Microsoft NT Server running iPlanet Web server Enterprise Edition Int.4.1 SP9 (or higher), Resin 2.1.4 (or higher), or Tomcat 3.2.1 (or higher).

The application is database driven using Oracle 8i or 9i. The EDI extraction modules require that, regardless of the server platform, the SQL*Loader utility that comes bundled with Oracle 8i or 9i is installed.

The application speed is primarily dependent on the performance of the server platform specifically the Oracle database. The web server and database can be on one machine or separate machines. Most of the application processing is done in Oracle in the database layer. Therefore, the more powerful the database server is, the quicker the response time will be for the users of the application.

B. Recommended Hardware and Software requirements:

For the User the hardware and software requirements are described in Tables 5 and 6.

All of the invoice line items and any exceptions that belong to the invoice are presented in the invoice grid of the Invoice Management Module 23.

Although the foregoing invention has been described in some detail by way of illustration an example for purposes of clarity of understanding, it will be obvious that certain changes and modifications may be practiced within the scope of the appended claims.

TABLE 1

| EDI or XML EXCEPTION ACTION |
|---|
| (1) EDI or XML syntax error:<br>Reject file - Transmit back an acknowledgment rejecting the received EDI or XML file. |
| (2) Exception in the EDI or XML file: (a different amount between global invoice total and the calculated total)<br>Reject file - Transmit back an acknowledgment rejecting the received EDI or XML file. |
| (3) Missing vendor:<br>Reject file - Transmit back an acknowledgment rejecting the received EDI or XML file. |
| (4) Duplicate Invoice: (Invoice Number + Invoice Date + Vendor + Account Number)<br>Reject file - Transmit back an acknowledgment rejecting the received EDI or XML file. |

TABLE 2

| Types of Invoice Exceptions | |
|---|---|
| Calling Card | Bill line item rate charges/minutes is not equal to the contracted rate for this vendor.<br>Bill line items that have 0 minutes and charges.<br>Percent change of the invoice line item compared to the invoice line item from the previous invoice.<br>Calling Card number that has no info in the system. |

TABLE 2-continued

| Types of Invoice Exceptions | |
|---|---|
| | Cost Center that is no longer active or in the system. |
| | Other charges that are not equal to 0. |
| | Late charges that are not equal to 0. |
| Conference Call | Cancellation Fee that is not equal to 0. |
| | Telemanagement charges that are not 0 on the bills. |
| | Bill line item rate charges/minutes is not equal to the contracted rate for this vendor. |
| | Bill line items that have 0 minutes and charges. |
| | Percent change of the invoice line item compared to the invoice line item from the previous invoice. |
| | Cost Center that is no longer active or in the system. |
| | Other charges that are not equal to 0. |
| | Late charges that are not equal to 0. |
| Local | Itemized calls that are not equal 0. |
| | Equipment Charges that are not equal to 0. |
| | Percent change of the invoice line item compared to the invoice line item from the previous invoice. |
| | Phone number/Circuit ID that is designated to another vendor in the system. |
| | Phone number/Circuit ID that has no info in the system. |
| | Cost Center that is no longer active or in the system. |
| | Other charges that are not equal to 0. |
| | Late charges that are not equal to 0. |
| Long Distance | Percent change of the invoice line item compared to the invoice line item from the previous invoice. |
| | Phone number/Circuit ID that is designated to another vendor in the system. |
| | Phone number/Circuit ID that has no info in the system. |
| | Cost Center that is no longer active or in the system. |
| | Other charges that are not equal to 0. |
| | Late charges that are not equal to 0. |
| | Equipment Charges that are not equal to 0. |
| Pager | Pager charges not equal to the contracted rates. |
| | Excess Page Charges/Number of Excess pages are not equal to 0. |
| | Percent change of the invoice line item compared to the invoice line item from the previous invoice. |
| | Pager number that is designated to another vendor in the system. |
| | Pager number that has no info in the system. |
| | Cost Center that is no longer active or in the system. |
| | Other charges that are not equal to 0. |
| | Late charges that are not equal to 0. |
| | Protection charges that are not 0 on the bills. |
| Toll Free | Toll Free charges not equal to the contracted rates. |
| | Percent change of the invoice line item compared to the invoice line item from the previous invoice. |
| | Phone number/Circuit ID that is designated to another vendor in the system. |
| | Phone number/Circuit ID that has no info in the system. |
| | Cost Center that is no longer active or in the system. |
| | Other charges that are not equal to 0. |
| | Late charges that are not equal to 0. |
| | Equipment Charges that are not equal to 0. |
| Wireless | Billed minutes is greater or less than plan number of standard minutes. |
| | Monthly service charges not equal to the contracted rates. |
| | Percent change of the invoice line item compared to the invoice line item from the previous invoice. |
| | Phone number that is designated to another vendor in the system. |
| | Phone number that has no info in the system. |
| | Cost Center that is no longer active or in the system. |
| | Other charges that are not equal to 0. |
| | Late charges that are not equal to 0. |
| | Equipment Charges that are not equal to 0. |
| | Roaming Charges that are not equal to 0 for plans without roaming. |
| | LD Charges that are not equal to 0 for plans without LD. |
| ATM | Percent change of the invoice line item compared to the invoice line item from the previous invoice. |
| | Circuit ID that is designated to another vendor in the system. |
| | Circuit ID that has no info in the system. |
| | Cost Center that is no longer active or in the system. |
| | Other charges that are not equal to 0. |
| | Late charges that are not equal to 0. |
| | Equipment Charges that are not equal to 0. |
| | Port Charges that are not equal to the contracted rates. |
| | Access Charges that are not equal to the contracted rates. |
| | PVC Charges that are not equal to the contracted rates. |
| Frame | Percent change of the invoice line item compared to the invoice line item from the previous invoice. |
| | Circuit ID that is designated to another vendor in the system. |
| | Circuit ID that has no info in the system. |

TABLE 2-continued

| Types of Invoice Exceptions | |
|---|---|
| | Cost Center that is no longer active or in the system.<br>Other charges that are not equal to 0.<br>Late charges that are not equal to 0.<br>Equipment Charges that are not equal to 0.<br>Port Charges that are not equal to the contracted rates.<br>Access Charges that are not equal to the contracted rates.<br>PVC Charges that are not equal to the contracted rates. |
| Internet | Percent change of the invoice line item compared to the invoice line item from the previous invoice.<br>Circuit ID that is designated to another vendor in the system.<br>Circuit ID that has no info in the system.<br>Cost Center that is no longer active or in the system.<br>Other charges that are not equal to 0.<br>Late charges that are not equal to 0.<br>Equipment Charges that are not equal to 0. |
| ISDN | Percent change of the invoice line item compared to the invoice line item from the previous invoice.<br>Phone Number that is designated to another vendor in the system.<br>Phone Number that has no info in the system.<br>Cost Center that is no longer active or in the system.<br>Other charges that are not equal to 0.<br>Late charges that are not equal to 0.<br>Equipment Charges that are not equal to 0. |
| Point To Point | Percent change of the invoice line item compared to the invoice line item from the previous invoice.<br>Circuit ID that is designated to another vendor in the system.<br>Circuit ID that has no info in the system.<br>Cost Center that is no longer active or in the system.<br>Other charges that are not equal to 0.<br>Late charges that are not equal to 0.<br>Equipment Charges that are not equal to 0. |
| Security | Percent change of the invoice line item compared to the invoice line item from the previous invoice.<br>Circuit ID that is designated to another vendor in the system.<br>Circuit ID that has no info in the system.<br>Cost Center that is no longer active or in the system.<br>Other charges that are not equal to 0.<br>Late charges that are not equal to 0.<br>Equipment Charges that are not equal to 0. |
| VPN | Percent change of the invoice line item compared to the invoice line item from the previous invoice.<br>Circuit ID that is designated to another vendor in the system.<br>Circuit ID that has no info in the system.<br>Cost Center that is no longer active or in the system.<br>Other charges that are not equal to 0.<br>Late charges that are not equal to 0.<br>Equipment Charges that are not equal to 0. |
| Other | Percent change of the invoice line item compared to the invoice line item from the previous invoice.<br>Phone Number/Circuit ID that is designated to another vendor in the system.<br>Phone Number/Circuit ID that has no info in the system.<br>Cost Center that is no longer active or in the system.<br>Other charges that are not equal to 0.<br>Late charges that are not equal to 0.<br>Equipment Charges that are not equal to 0. |
| Equipment Maintenance | Percent change of the invoice line item compared to the invoice line item from the previous invoice.<br>Invoice total is different for the Quote total.<br>Cost Center that is no longer active or in the system.<br>Late charges that are not equal to 0. |
| Equipment Purchase | Percent change of the invoice line item compared to the invoice line item from the previous invoice.<br>Invoice total is different for the Quote total.<br>Cost Center that is no longer active or in the system.<br>Late charges that are not equal to 0. |
| Equipment Repair | Percent change of the invoice line item compared to the invoice line item from the previous invoice.<br>Invoice total is different for the Quote total.<br>Cost Center that is no longer active or in the system.<br>Late charges that are not equal to 0. |
| Equipment Lease | Percent change of the invoice line item compared to the invoice line item from the previous invoice.<br>Invoice total is different for the Quote total.<br>Cost Center that is no longer active or in the system.<br>Late charges that are not equal to 0. |

TABLE 3

| Type of Status | Color | Grid (left region of the screen) |
|---|---|---|
| Approved/Normal Invoices | None | Approved Invoices |
| Needs to be Reviewed, has no exceptions | None | Pending Approval |
| Needs to be Reviewed, has exceptions | Red | Pending Approval |
| Reviewed, waiting to be sent to AP/GL by the AP/GL process that is integrated in the application | Green | Pending Approval |

TABLE 4

| Report type | Description |
|---|---|
| Audit Reports | There is implemented one audit report for each type of service type. The audit reports are grouped under 3 major categories: Voice, Data and Equipment. For each major type and for each service type, there is a set of audit (exception) criteria, from which the user can choose in order to see a report. |
| Custom Reports | The following reports are available:<br>Standard (multiple services) custom report<br>Data Fixed or has Direct Billing custom report<br>Invoice Approved, waiting to be sent to Accounting custom report<br>Fixed Allocation Charges Report<br>Full-time Employee (FTE) Report<br>Physical Inventory custom report |
| Summary Reports: All Services | The following reports are available:<br>Disconnect<br>Invoice<br>Invoice Not Received<br>Service Type<br>Cost Center<br>GL<br>Total Telecom Expense<br>Vendor |
| Summary Reports: Data | The following reports are available:<br>Summary<br>Frame/ATM<br>PVC<br>Circuit |
| Summary Reports: Equipment | The following reports are available:<br>Maintenance<br>Purchase |
| Summary Reports: System | The following reports are available:<br>Cost Centers<br>Vendors<br>Phone<br>Circuit ID |

TABLE 5

Processor: minimum Intel Celeron 433 MHz or equivalent.
OS: Windows 95, 98, NT, 2000, or XP computers.
Memory: 64 MB of RAM.
Hard Drive: sufficient capacity for OS and browser.
Browser: IE 5.0+ or Netscape 4.73+
Display: minimum of 17" monitor capable of 1280 × 1024, 19" monitor is recommended.
Video Adapter: minimum of 8 MB of RAM capable of supporting 1280 × 1024 resolution.

TABLE 6

Server (option 1)

Processor: minimum Intel Pentium III 600 MHz
OS: Windows NT 4.0 SP6a or Windows 2000 SP2
Memory: minimum of 512 MB of RAM
Hard Drive: 9.0 GB SCSI2
Software: Oracle 8i or 9i w/SQL*Loader, iPlanet Web TABLE 6-continued Server Enterprise 4.1 SP9+ (optional
Resin 2.1.4+, Tomcat 3.2.1+ or IIS w/Resin or Tomcat as the JSP engine)

Server (option 2)

Processors: minimum Dual 300-MHz UltraSPARC-II CPUs
OS: Solaris 8 or higher
Memory: minimum of 512 MB of RAM
Hard Drive: 36 GB SC SI2
Software: Oracle 8i or 9i w/SQL*Loader, iPlanet
Web Server Enterprise 4.1 SP9+ (optional
Resin 2.1.4+ or Tomcat 3.2.1+)

I claim:

1. A method for electronically identifying billing exceptions within telecommunication invoices received from one or more vendors, comprising:

(a) importing telecommunication invoices;

(b) extracting elements from the imported telecommunications invoices;

(c) performing a reasonability test on the imported telecommunication invoices, wherein performing the reasonability test includes evaluating the telecommunication invoices on an element basis to determine whether an element billing exception exists and determining whether a cost center associated with the element is active; and (d) generating a report that identifies the element billing exceptions.

2. The method of claim 1, wherein an element is an individual charge at its smallest component.

3. The method of claim 1, wherein an element is a line item.

4. The method of claim 1, wherein an element is a service code.

5. The method of claim 4, wherein an element is a Universal Service Ordering Code (USOC).

6. The method of claim 1, wherein the telecommunications invoices are provided by at least two different vendors.

7. The method of claim 1, wherein the telecommunications invoices include charges for one or more of calling card services, conference call services, local voice services, long distance voice services, pager services, toll free voice services, wireless communication services, ATM services, frame relay services, Internet services, ISDN services, point-to-point trunk services, security services, VPN services, telecommunications equipment purchases, telecommunications equipment repair, telecommunications equipment lease and telecommunications equipment maintenance.

8. The method of claim 1, wherein importing telecommunications invoices includes importing one or more of EDI, XML, custom, or paper invoices.

9. The method of claim 1, further comprising performing a pre-analysis communication error check on the imported telecommunications invoices, wherein an invoice is rejected and transmitted back to a vendor when a transmission exception is found.

10. The method of claim 1, wherein a transmission exception includes a syntax error, a missing vendor, or a duplicate invoice.

11. The method of claim 1, wherein extracting elements from imported telecommunications invoices includes applying a set of vendor mapping rules to vendor specific nomenclatures for elements to transform the vendor specific nomenclature for the elements to categories that are comparable.

12. The method of claim 1, further comprising performing an initial invoice sanity check before step (c), wherein a total sum of element charges is compared to the invoice total of a received invoice.

13. The method of claim 12, further comprising purging an invoice that fails the initial invoice sanity check and generating an error report to the vendor.

14. The method of claim 1, wherein an element billing exception criteria is customizable.

15. The method of claim 1, wherein performing a reasonability test on an element includes comparing an element charge against the contracted rate for the element.

16. The method of claim 1, wherein performing a reasonability test on an element includes determining whether the element is associated with a line or circuit in an inventory database.

17. The method of claim 1, further comprising displaying the report that identifies the element billing exceptions.

18. The method of claim 17, further comprising displaying details regarding an element billing exception upon receiving a request for more information on the element billing exception.

19. The method of claim 17, wherein the displayed report includes USOC codes and the USOC description for selected element charges.

20. The method of claim 1, further comprising electronically notifying a vendor of one or more element billing exception.

21. A method for electronically processing telecommunications invoices from one or more vendors, comprising:

(a) importing telecommunications invoices;

(b) extracting elements from the imported telecommunications invoices;

(c) performing a reasonability test on the imported telecommunications invoices, wherein performing the reasonability test includes evaluating the telecommunication invoices on an element basis to determine whether an element billing exception exists; and determining whether a cost center associated with the element is active (d) generating a report that identifies the element billing exceptions;

(e) receiving instructions for treatment of the element billing exceptions; and (f) transmitting approved invoice information.

22. The method of claim 21, wherein an element is an individual charge at its smallest component.

23. The method of claim 21, wherein an element is a line item.

24. The method of claim 21, wherein an element is a service code.

25. The method of claim 21, wherein an element is a Universal Service Ordering Code (USOC).

26. The method of claim 21, transmitting approved invoice information includes transmitting approved invoice information to either or both of an accounts processing system and a general ledger system.

27. The method of claim 21, wherein the telecommunications invoices include charges for more than one of calling card services, conference call services, local voice services, long distance voice services, pager services, toll free voice services, wireless communication services, ATM services, frame relay services, Internet services, ISDN services, point-to-point trunk services, security services, VPN services, telecommunications equipment purchases, telecommunications equipment repair, telecommunications equipment lease and telecommunications equipment maintenance.

28. The method of claim 21, further comprising performing a pre-analysis communication error check on the imported telecommunications invoices, wherein an invoice is rejected and transmitted back to a vendor when a transmission exception is found.

29. The method of claim 21, wherein extracting elements from imported telecommunications invoices includes applying a set of vendor mapping rules to vendor specific nomenclature for elements to transform the vendor specific nomenclature to categories that are comparable.

30. The method of claim 21, further comprising performing an initial invoice sanity check, wherein a total sum of line item charges is compared to the invoice total of a received invoice.

31. The method of claim 21, wherein performing a reasonability test on an element charge includes comparing the element charge against the contracted rate for the element.

32. The method of claim 21, further comprising displaying the report that identifies the line element billing exceptions.

33. The method of claim 32, further comprising displaying details regarding an element billing exception upon receiving a request for more information on the element billing exception.

34. The method of claim 33, wherein the displayed report includes USOC codes and the USOC description for selected line item charges.

35. The method of claim 21, further comprising changing an exception status of an element billing exception upon receiving a request to change the element billing exception status.

36. The method of claim 21, further comprising displaying a status for an invoice that indicates whether the invoice has been approved.

37. The method of claim 21, further comprising paying a telecommunication invoice and allocating costs to cost centers.

38. A system for electronically identifying billing exceptions within a telecommunication invoices received from one or more vendors, comprising a user database configured to store vendor mapping rules, telecommunications invoices and data extracted from telecommunications invoices; and a user application module coupled to the user database, wherein the user application module includes:

means for extracting elements from the telecommunications invoices;

means for organizing the elements into common categories; and means for performing a reasonability test on the imported telecommunication invoices wherein performing the reasonability test includes evaluating the telecommunication invoices on an element basis to determine whether an element billing exception exists; and determining whether a cost center associated with the element is active means for generating a report that identifies the element billing exceptions.

39. The system of claim 38, wherein an element is an individual charge at its smallest component.

40. The method of claim 38, wherein an element is a line item.

41. The method of claim 38, wherein an element is a service code.

42. The method of claim 38, wherein an element is a Universal Service Ordering Code (USOC).

43. The system of claim 38, wherein the telecommunications invoices are provided by at least two different vendors.

44. The system of claim 38, wherein the telecommunications invoices include charges for more than one of calling card services, conference call services, local voice services, long distance voice services, pager services, toll free voice services, wireless communication services, ATM services, frame relay services, Internet services, ISDN services, point-to-point trunk services, security services, VPN services, telecommunications equipment purchases, telecommunications equipment repair, telecommunications equipment lease and telecommunications equipment maintenance.

45. The system of claim 38, further including a means for importing telecommunications invoices.

46. The system of claim 38, further comprising means for performing a pre-analysis communication error check on the imported telecommunications invoices, wherein an invoice is rejected and transmitted back to a vendor when a transmission exception is found.

47. The system of claim 38, wherein a transmission exception includes a syntax error, a missing vendor, or a duplicate invoice.

48. The system of claim 38, further comprising a means of extracting elements from imported telecommunications invoices includes by applying a set of vendor mapping rules to vendor specific nomenclature for elements to transform the vendor specific nomenclature for the elements to categories that are comparable.

49. The method of claim 38, further comprising means to customize billing exception criteria.

50. The system of claim 38, further comprising means for performing a reasonability test on an element by comparing an element charge against the contracted rate for the element.

51. The system of claim 38, further comprising means for displaying the report that identifies the element billing exceptions.

52. The system of claim 51, further comprising means for displaying details regarding an element billing exception upon receiving a request for more information on the element billing exception.

53. The system of claim 51, wherein the displayed report includes USOC codes and the USOC description for each line item charge.

54. The system of claim 38, further comprising means for notifying a vendor of an element billing exception.

55. The system of claim 38, further comprising means for interfacing with a remote system to receive vendor mapping rules updates.

56. A system for electronically processing telecommunications invoices from one or more vendors, comprising:

(a) means for importing telecommunications invoices;

(b) means for extracting elements from the imported telecommunications invoices;

(c) means for performing a reasonability test on the imported telecommunications invoices, wherein performing the reasonability test includes evaluating telecommunication invoices on an element basis to determine whether an element billing exception exists; and determining whether a cost center associated with the element is active (d) means for generating a report that identifies the element billing exceptions;

(e) means for receiving instructions for treatment of the element billing exceptions; and (f) means for transmitting approved invoice information to either or both of an accounts processing system or a general ledger system.

* * * * *

UNITED STATES PATENT AND TRADEMARK OFFICE

CERTIFICATE OF CORRECTION

PATENT NO. : 7,340,422 B2
APPLICATION NO. : 10/361519
DATED : March 4, 2008
INVENTOR(S) : Jason M. Fisher It is certified that error appears in the above-identified patent and that said Letters Patent is hereby corrected as shown below:

Column 17

Lines 39-40, please replace “an element billing exception exists; and determining whether a cost center associated with the element is active” with --an element billing exception exists and determining whether a cost center associated with the element is active;--.

Column 18

Lines 55-57, please replace “whether an element billing exception exists; and determining whether a cost center associated with the element is active” with --determine whether an element billing exception exists and determining whether a cost center associated with the element is active;--.

Column 20

Lines 25-27, please replace “whether an element billing exception exists; and determining whether a cost center associated with the element is active” with --determine whether an element billing exception exists and determining whether a cost center associated with the element is active;--.

Signed and Sealed this

Thirty-first Day of March, 2009

JOHN DOLL

*Acting Director of the United States Patent and Trademark Office*

UNITED STATES PATENT AND TRADEMARK OFFICE

CERTIFICATE OF CORRECTION

PATENT NO. : 7,340,422 B2
APPLICATION NO. : 10/361519
DATED : March 4, 2008
INVENTOR(S) : Jason M. Fisher It is certified that error appears in the above-identified patent and that said Letters Patent is hereby corrected as shown below:

Column 18
Line 62, please replace "The method of claim 38," with --The system of claim 38,--.

Column 18
Line 64, please replace "The method of claim 38," with --The system of claim 38,--.

Column 18
Line 66, please replace "The method of claim 38," with --The system of claim 38,--.

Column 19
Line 29, please replace "The method of claim 38," with --The system of claim 38,--.

Signed and Sealed this

Second Day of November, 2010

David J. Kappos

David J. Kappos
*Director of the United States Patent and Trademark Office*